(12) United States Patent
Ols et al.

(10) Patent No.: US 11,111,801 B2
(45) Date of Patent: Sep. 7, 2021

(54) TURBINE VANE WITH PLATFORM PAD

(71) Applicant: United Technologies Corporation, Hartford, CT (US)

(72) Inventors: John T. Ols, Northborough, MA (US); Richard N. Allen, West Hartford, CT (US); Steven D. Porter, Wethersfield, CT (US); Paul K. Sanchez, Wellington, FL (US); Sandra S. Pinero, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1552 days.

(21) Appl. No.: 14/787,332

(22) PCT Filed: May 21, 2014

(86) PCT No.: PCT/US2014/038914
§ 371 (c)(1),
(2) Date: Oct. 27, 2015

(87) PCT Pub. No.: WO2014/204608
PCT Pub. Date: Dec. 24, 2014

(65) Prior Publication Data
US 2016/0069200 A1 Mar. 10, 2016

Related U.S. Application Data

(60) Provisional application No. 61/835,686, filed on Jun. 17, 2013.

(51) Int. Cl.
*F01D 9/04* (2006.01)
*F01D 5/14* (2006.01)
(Continued)

(52) U.S. Cl.
CPC ............... *F01D 9/042* (2013.01); *F01D 5/14* (2013.01); *F01D 5/141* (2013.01); *F01D 9/02* (2013.01);
(Continued)

(58) Field of Classification Search
CPC . F01D 9/042; F01D 9/047; F01D 9/02; F01D 9/04; F01D 9/041; F01D 25/162; F01D 25/24; F01D 25/246; F01D 25/28
See application file for complete search history.

(56) References Cited

U.S. PATENT DOCUMENTS 4,511,306 A 4/1985 Hultgren
4,907,946 A * 3/1990 Ciokajlo ................. F01D 9/042
415/135

(Continued)

FOREIGN PATENT DOCUMENTS

JP 2001152804 A 6/2001

OTHER PUBLICATIONS

International Preliminary Report on Patentability for International Application No. PCT/US2014/038914 dated Dec. 30, 2015.
(Continued)

*Primary Examiner* — Justin D Seabe
(74) *Attorney, Agent, or Firm* — Carlson, Gaskey & Olds, P.C.

(57) ABSTRACT

A vane has an airfoil extending between a radially outer platform and a radially inner platform. At least one of the platforms has nominally radially thinner portions, and a pad defining a radially thicker portion. The pad has a radial thickness that is greater than a thickness of the nominal radially thinner portions. The pad surrounds an outer periphery of the airfoil on a side of the radially outer platform. The pad has a varying radial thickness. A mid-turbine frame and a gas turbine engine are also disclosed.

4 Claims, 4 Drawing Sheets

(51) Int. Cl.
  *F01D 9/02* (2006.01)
  *F01D 25/24* (2006.01)

(52) U.S. Cl.
  CPC ............... *F01D 9/04* (2013.01); *F01D 9/047* (2013.01); *F01D 25/24* (2013.01); *F05D 2230/53* (2013.01); *Y02T 50/60* (2013.01)

(56) References Cited

U.S. PATENT DOCUMENTS

| | | | |
|---|---|---|---|
| 5,411,370 A * | 5/1995 | Varsik | F01D 9/042 |
| | | | 415/119 |
| 6,371,725 B1 | 4/2002 | Manteiga et al. | |
| 6,419,447 B1 | 7/2002 | Watanabe et al. | |
| 6,669,445 B2 | 12/2003 | Staubach et al. | |
| 7,762,761 B2 * | 7/2010 | Busch | F01D 9/042 |
| | | | 415/1 |
| 8,292,573 B2 * | 10/2012 | Broomer | F01D 9/041 |
| | | | 415/178 |
| 8,424,313 B1 | 4/2013 | Praisner et al. | |
| 2002/0076324 A1 | 6/2002 | Abuaf et al. | |
| 2004/0062636 A1 | 4/2004 | Mazzola et al. | |
| 2006/0275112 A1 | 12/2006 | Lee et al. | |
| 2008/0181766 A1 | 7/2008 | Campbell et al. | |
| 2010/0254804 A1 * | 10/2010 | Harper | F01D 9/042 |
| | | | 415/119 |
| 2010/0278644 A1 | 11/2010 | Gersbach et al. | |
| 2011/0008163 A1 | 1/2011 | Prentice et al. | |
| 2011/0081228 A1 | 4/2011 | Durocher et al. | |
| 2013/0067930 A1 | 3/2013 | Paradis | |

OTHER PUBLICATIONS

International Search Report for PCT Application No. PCT/US2014/038748 dated Sep. 18, 2014.

* cited by examiner

TURBINE VANE WITH PLATFORM PAD

CROSS-REFERENCE TO RELATED APPLICATION

This application claims priority to U.S. Provisional Application No. 61/835,686, filed Jun. 17, 2013.

BACKGROUND

This application relates to a vane for use as a static element in a gas turbine engine, wherein a platform is provided with a pad that varies in thickness.

Gas turbine engines are known and, typically, include a compressor delivering air into a combustion section where it is mixed with fuel and ignited. Products of this combustion pass downstream over turbine rotors driving them to rotate. Static vanes are often positioned between adjacent turbine rotors and serve to redirect flow such that it is in a desired condition when it reaches a downstream turbine rotor.

One such location is a mid-turbine frame positioned between a higher pressure turbine rotor and a lower pressure turbine rotor. A mid-turbine frame typically includes vanes having an outer platform and a radially inner platform with an airfoil extending between the two platforms.

The vanes are subject to a number of stresses and designing the vanes to address these stresses is challenging.

SUMMARY

In a featured embodiment, a vane has an airfoil extending between a radially outer platform and a radially inner platform. At least one of the platforms has nominally radially thinner portions, and a pad defining a radially thicker portion. The pad has a radial thickness that is greater than a thickness of the nominal radially thinner portions and the pad surrounds an outer periphery of the airfoil on a side of the radially outer platform. The pad has a varying radial thickness.

In another embodiment according to the previous embodiment, the at least one of the platforms is the radially outer platform.

In another embodiment according to any of the previous embodiments, the pad has a radially thickest portion forward of a leading edge of the airfoil, and radially thinner portions extending toward a trailing edge of the airfoil.

In another embodiment according to any of the previous embodiments, there is at least one securement feature, and a plurality of the airfoils, with the securement feature positioned circumferentially between the plurality of airfoils, and the pad surrounding the securement feature.

In another embodiment according to any of the previous embodiments, the securement feature is a pin boss. An area around the pin boss curves upwardly to a greater radial thickness that merges into the pin boss.

In another embodiment according to any of the previous embodiments, a ratio of a radial thickness of the radially thickest portion to a radial thickness of one of the nominally radially thinner portions is greater than or equal to about 1.1 and less than or equal to about 7.0.

In another embodiment according to any of the previous embodiments, the ratio is greater than or equal to about 2.0.

In another embodiment according to any of the previous embodiments, a ratio of a radial thickness of the pad at locations spaced toward the trailing edge compared to a thickness at the nominally thinner portion is greater than or equal to about 1.1 and less than or equal to about 4.0.

In another embodiment according to any of the previous embodiments, the outer platform has a first overstock at a forward edge beyond a leading edge of the airfoil and a second overstock at a back edge beyond a trailing edge of the airfoil. The pad extends axially between the first overstock and the second overstock.

In another embodiment according to any of the previous embodiments, an outwardly facing surface of the at least one of the platforms has a first total surface area and the pad having a second surface area. The second surface area is between about 15% and 50% of the first total surface area.

In another featured embodiment, a mid-turbine frame has a plurality of vanes extending between a radially outer platform and a radially inner platform. The radially outer platform has nominally radially thinner portions, and a pad defining a radially thicker portion. The pad has a radial thickness that is greater than a thickness of the nominally radially thinner portions and the pad surrounding an outer periphery of the airfoils on a radially outer side of the radially outer platform. The pad has a varying radial thickness.

In another embodiment according to the previous embodiment, the pad has a radially thickest portion forward of a leading edge of the airfoil. Radially thinner portions extend toward a trailing edge of the airfoil.

In another embodiment according to any of the previous embodiments, there is at least one securement feature, and a plurality of the airfoils. The securement feature is positioned circumferentially between the plurality of airfoils, and the pad surrounds the securement feature.

In another embodiment according to any of the previous embodiments, the securement feature is a pin boss. An area around the pin boss curves upwardly to a greater radial thickness that merges into the pin boss.

In another embodiment according to any of the previous embodiments, a ratio of a radial thickness of the radially thickest portion to a radial thickness of one of the nominally radially thinner portions is greater than or equal to about 1.1 and less than or equal to about 10.

In another embodiment according to any of the previous embodiments, the ratio is greater than or equal to about 2.0.

In another embodiment according to any of the previous embodiments, a ratio of the pad portion at locations spaced toward the trailing edge compared to the thickness at the nominally thin portion is greater than or equal to about 1.1 and less than or equal to about 4.0.

In another embodiment according to any of the previous embodiments, an outwardly facing surface of the at least one of the platforms has a first total surface area and the pad has a second surface area. The second surface area is between about 15% and 50% of the first total surface area.

In another featured embodiment, a gas turbine engine has a first higher pressure turbine rotor and a second lower pressure turbine rotor. A mid-turbine frame is mounted between the first and second turbine rotors, and supports a bearing. The mid-turbine frame includes a plurality of vanes including an airfoil extending between a radially outer platform and a radially inner platform. The radially outer platform has nominally radially thinner portions, and a pad defines a radially thicker portion. The pad has a radial thickness that is greater than a thickness of the nominal radially thinner portions and the pad surrounds an outer periphery of the airfoil on a radially outer side of the radially outer platform. The pad has a varying radial thickness.

In another embodiment according to the previous embodiment, the pad has a thickest portion forward of a leading edge of the airfoil, and thinner portions extend toward a trailing edge of the airfoil.

In another embodiment according to any of the previous embodiments, there is at least one pin boss, and a plurality of the airfoils. The pin boss is positioned circumferentially between the plurality of airfoils, and the pad surrounds the pin boss.

In another embodiment according to any of the previous embodiments, a ratio of a radial thickness of the radially thickest portion to a radial thickness of one of the nominally radially thinner portions is greater than or equal to about 1.1 and less than or equal to about 10.

In another embodiment according to any of the previous embodiments, an outwardly facing surface of the at least one of the platforms has a first total surface area and the pad has a second surface area. The second surface area is between about 15% and 50% of the first total surface area.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

These and other features may be best understood from the following drawings and specification.

DETAILED DESCRIPTION

Figure 1A:
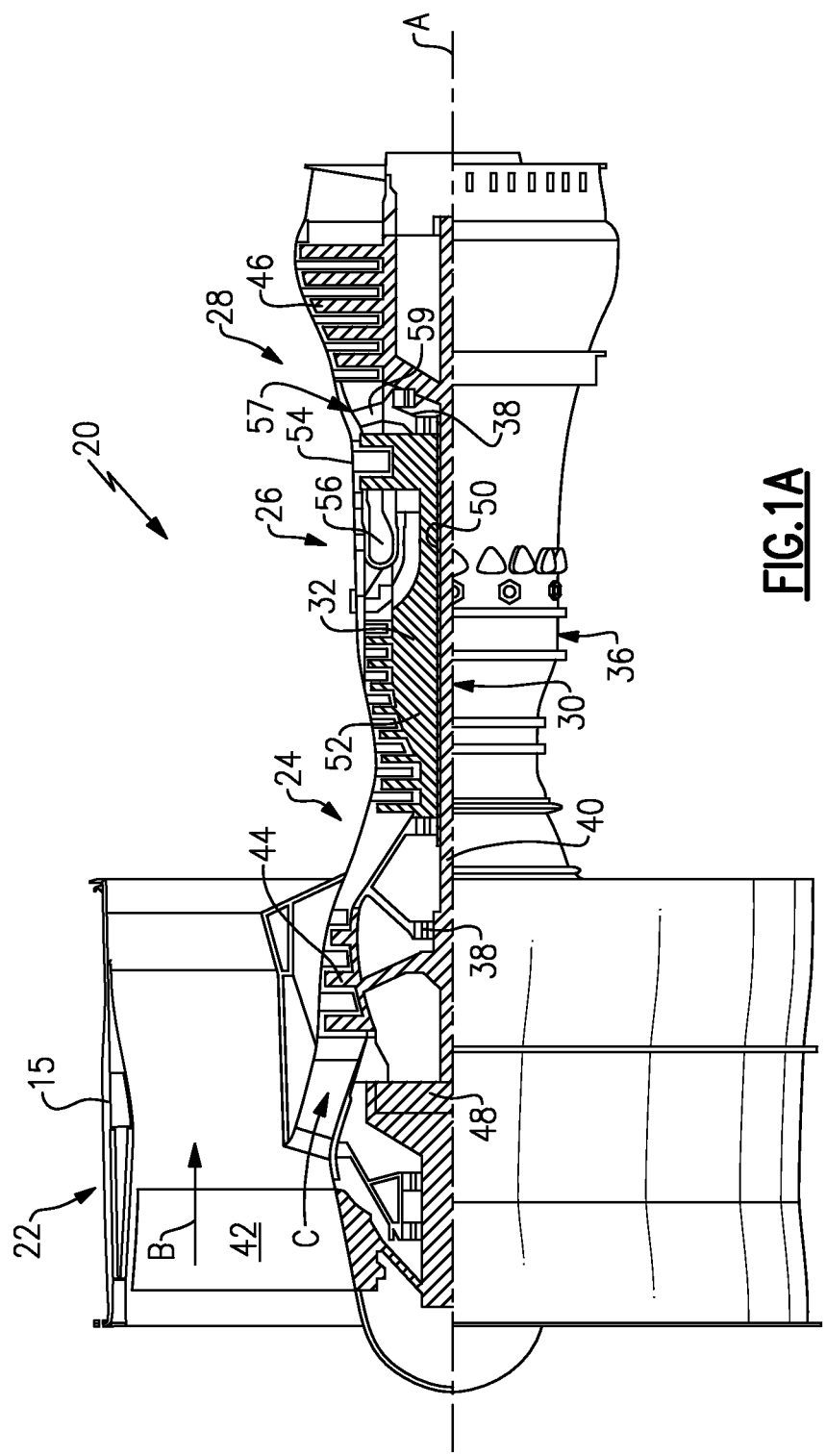
FIG. 1A schematically shows a gas turbine engine.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes. In the case of a three-spool engine, not shown in FIG. 1A, multiple mid-turbine frames 57 may exist between for example a high spool and an intermediate spool and an intermediate spool and a low spool. The various embodiments disclosed herein are capable of being applied to multiple such locations by one of ordinary skill in the art.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\,^{\circ}\,R)/(518.7^{\circ}\,R)]^{0.5}$. The "Low corrected fan tip speed" as disclosed herein according to one non-limiting embodiment is less than about 1150 ft/second.

Figure 1B:
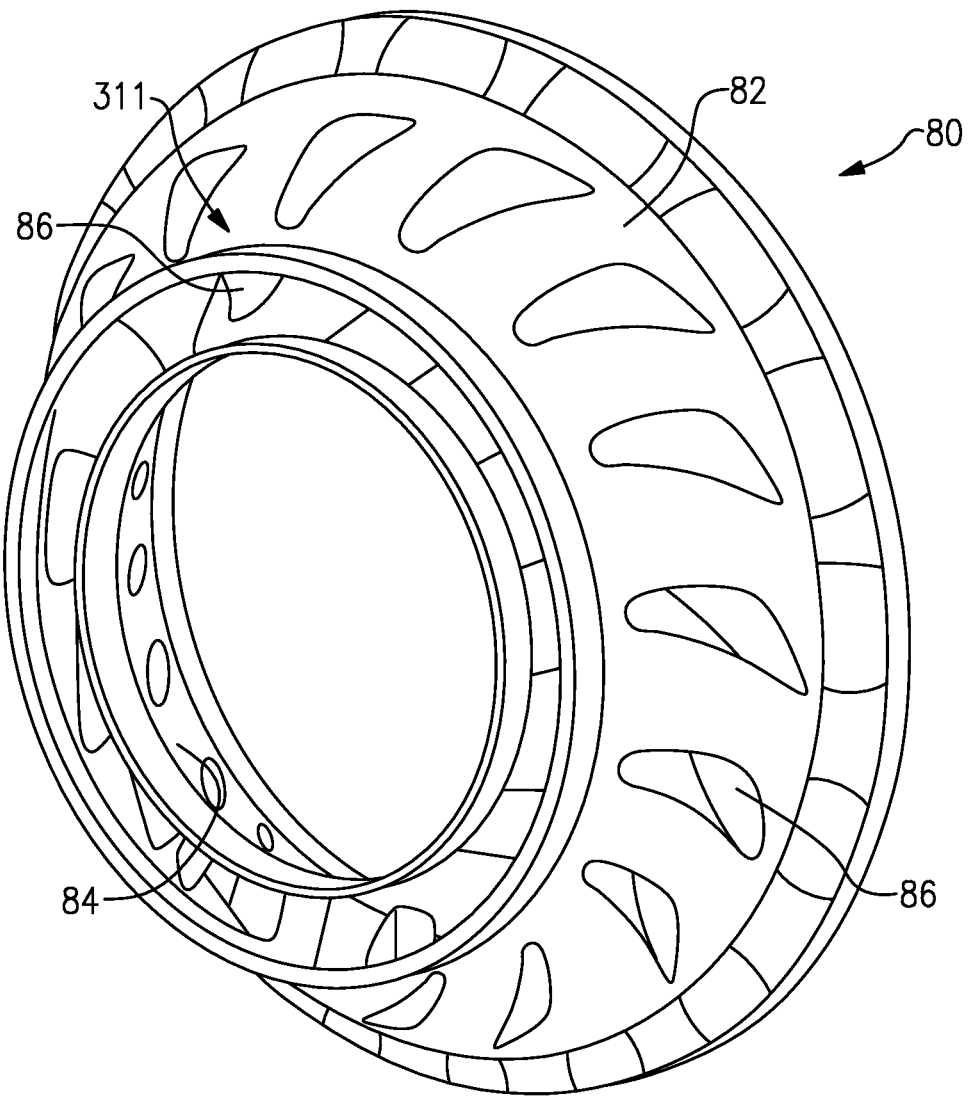
FIG. 1B shows a mid-turbine frame.

FIG. 1B shows a mid-turbine frame 80 which will be located in place of the mid-turbine frame 57 in the FIG. 1A engine. An outer platform 82 is at a radially outer location and an inner platform 84 is at a radially inner location. The inner platform 84 may support a bearing, like bearing 38 of FIG. 1A. Alternatively, it may surround a separate structure supporting a bearing. A plurality of airfoils 86 extend between the platforms 82 and 84. A vane 311 can be defined as an airfoil 86 and its platforms 82 and 84.

Figure 2A:
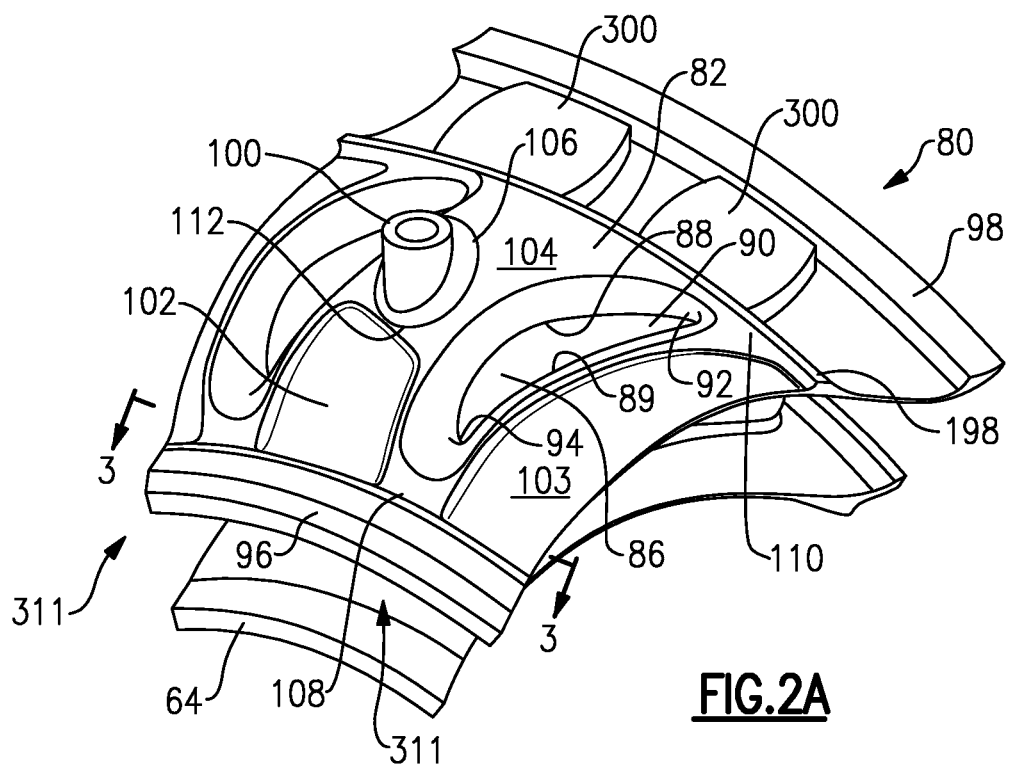
FIG. 2A shows a first detail of a vane.

As shown in FIG. 2A, the mid-turbine frame 80 has the outer platform 82 with a relatively thick overstock 96 at a forward axial end adjacent a leading edge 94 of the airfoil 86 and another relatively thick overstock 98 at a rear of aft axial end adjacent a trailing edge 92. Both overstock 96 and 98 are relatively thick as compared to the nominal thickness of portions 102 and 103 of the outer platform 82 disposed between the overstock 96 and the overstock 98.

As shown in FIG. 1B, the vanes 311 disposed axially around the centerline of the engine 20 in a single circumference. FIG. 1B shows two vanes 311 connected together to form a repeating unit. That is, the vanes 311 can be individual units or can be grouped with multiple vanes 311 in each repeating unit. The mid-turbine frame 80 may thus be formed by connecting together such repeating units containing vanes 311 such as shown in FIG. 1B. On the other hand, in a disclosed embodiment, the mid-turbine frame 80 is cast as a single part.

The overstocks 96 and 98 can be seen to be relatively thick compared to nominal thinner sections 102 and 103. A pad 104 is thicker than the nominal sections 102 and 103 and surrounds the airfoil shape of the airfoil 86. As can be appreciated, the airfoil 86 has a hollow 90 defined between circumferential walls 88 and 89.

In addition, a pin boss 100 has a thicker portion 112 leading into a body of the pin boss 100. The pin boss 100 is found in the repeating unit shown in FIG. 2A, however other repeating units disposed elsewhere along the circumference of the mid-turbine frame 80 may not possess a pin boss 100 or a thicker portion 112.

As can be appreciated, the pad 104 does surround the pin boss 100, but is generally not found between adjacent vanes 86. The thicker pad portion 112 curves outwardly into the pin boss 100, as shown at 106. Instead, nominal area 103 is between vanes 86 that are not positioned adjacent a pin boss 100.

Figure 2B:
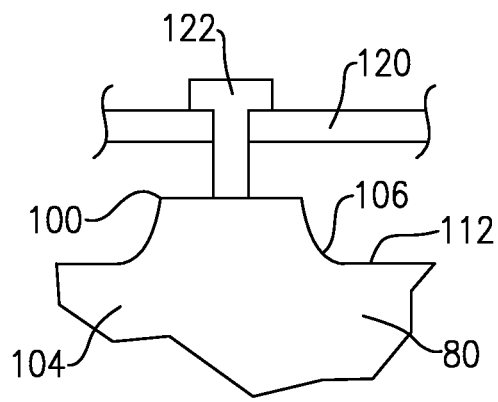
FIG. 2B schematically shows a mount location.

FIG. 2B shows the pin boss 100 receiving a pin 122 to secure the mid-turbine frame 80 to a housing 120 of the engine, all shown schematically. While a pin boss 100 is shown, it should be understood that the pin boss 100 is one type of securement feature and that other securement features could be utilized. As an example, a hook may be included at the location of the pin boss 100 to secure the mid-turbine frame 80 within a housing 120.

The area 108 adjacent the forward or leading edge overstock 96 is the thickest portion of the pad 104, and the pad 104 becomes thinner when moving toward the trailing edge 92. However, as is clear from FIG. 2A, the thicker pad section does extend from the area 108 to the portion or area 110, such that it does connect the overstocks 96 and 98. As can also be appreciated from FIG. 2A, there is a rib 198 intermediate the airfoils 86 and the overstock 98. Enlarged portion 300 of the pad spans an axial distance between the rib 198 and the overstock 98 such that the thicker pad section does extend to fully connect the overstocks 96 and 98. Note that portions 300 may not extend to the full thickness of overstock 98. The rib 198 may be eliminated in some designs.

Figure 3:
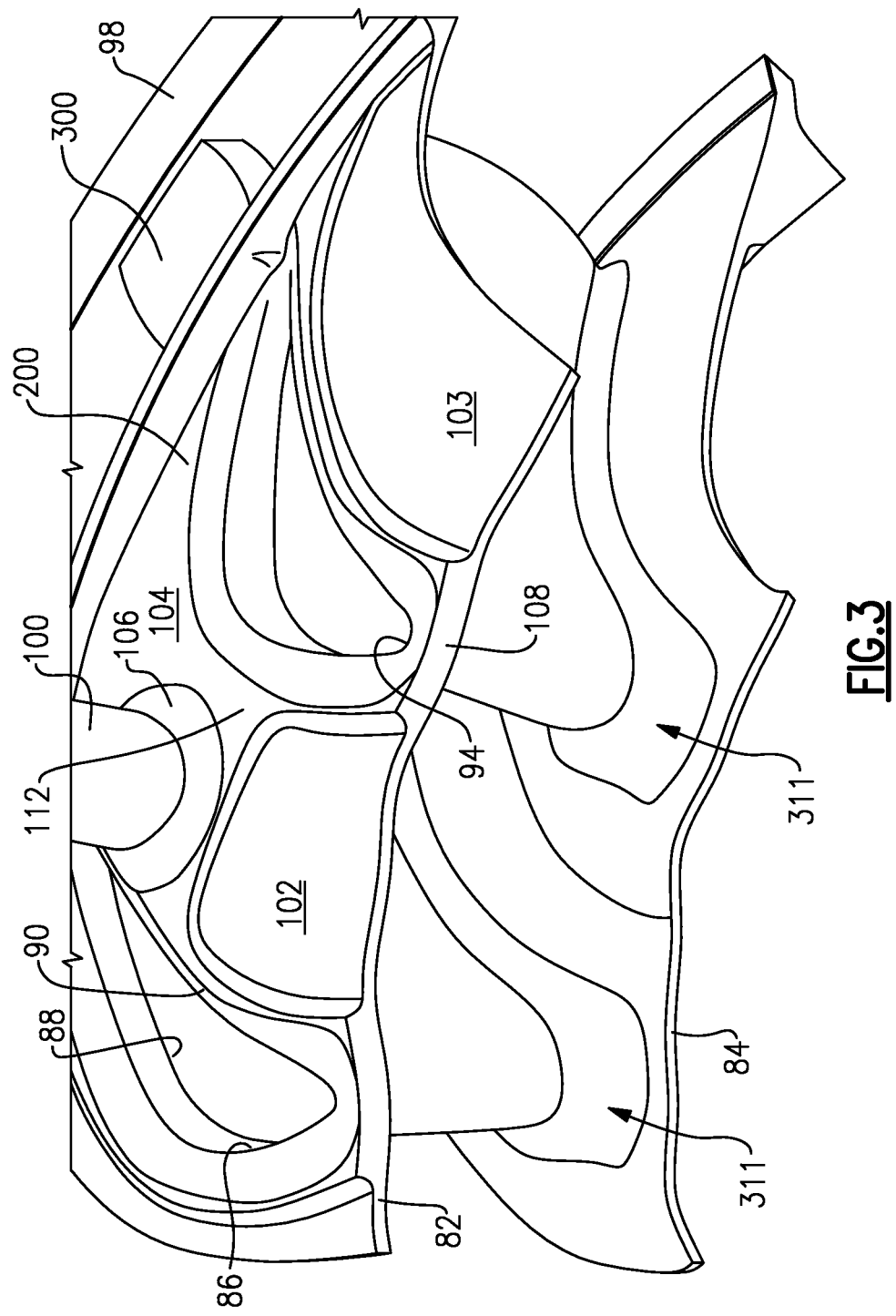
FIG. 3 shows another detail of the FIG. 2A vane.

As shown in FIG. 3, the wall thickness varies within the pad 104. Generally, the thickest portion would be adjacent and forward of the leading edge 94 at area 108. The pad 104 is also thicker adjacent the pin boss 100. In embodiments, the pad in the area 108 may be 0.220 inch (0.5588 centimeter) while the thickness of the nominal thinner section 102 might be 0.080 inch (0.2032 centimeter). A ratio of the thickness at the area 108 to the thickness at the section 102 may be greater than or equal to about 1.1 up and less than or equal to about 7.0. More generally, the ratio between the area 108 and the thickness at section 102 would be greater than or equal to about 2.0. In contrast, a ratio of the thickness adjacent the area 110 compared to the thickness at the section 102 may be greater than or equal to about 1.1 and less than or equal to about 4.0.

In one actual example, the thicker pad portion accounted for 22% of the total surface area of a radially outer face of the outer platform. In another example, it was 27%. In embodiments, the thicker pad portion covers between about 15% and 50% of the total surface area. In more narrow embodiments, the thicker pad portion would account for at least 20% of the total surface area.

The variable thickness pad at the outer platform 82 thus provides additional material at areas of high stress and the nominal portions result in a relatively lighter weight.

The thicker pad extending to the leading edge overstock facilitates the flow of material into the mold when the part is initially cast. In addition, by having the thicker pad at the leading edge overstock, sufficient material will flow into the mold to ensure the thinner portions are also adequately provided with material. As such, the thicker pad not only addresses stress concentrations, but also ensures the part will be properly cast. As known, the overstocks are typically removed prior to use.

The thinner areas not only reduce weight, but they also allow the part to flex during use.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A mid-turbine frame comprising:
   a plurality of vanes each including an airfoil extending between a radially outer platform and a radially inner platform;
   said radially outer platform having nominally radially thinner portions, and a pad defining a radially thicker portion, with said pad having a radial thickness that is greater than a thickness of said nominally radially thinner portions and said pad surrounding an outer periphery of said airfoils on a radially outer side of said radially outer platform, and said pad having a varying radial thickness; and
   said nominally radially thinner portions being circumferentially intermediate adjacent airfoils of the plurality of vanes; and wherein said pad having a radially thickest portion forward of a leading edge of said airfoil, and radially thinner portions extending toward a trailing edge of said airfoil.

2. The mid-turbine frame as set forth in claim 1, wherein there is at least one securement feature, and a plurality of said airfoils, with said securement feature being positioned circumferentially between said plurality of airfoils, and said pad surrounding said securement feature.

3. The mid-turbine frame as set forth in claim 2, wherein said securement feature is a pin boss and an area around said pin boss curving upwardly to a greater radial thickness that merges into said pin boss.

4. A mid-turbine frame comprising:
 a plurality of vanes each including an airfoil extending between a radially outer platform and a radially inner platform;
 said radially outer platform having nominally radially thinner portions, and a pad defining a radially thicker portion, with said pad having a radial thickness that is greater than a thickness of said nominally radially thinner portions and said pad surrounding an outer periphery of said airfoils on a radially outer side of said radially outer platform, and said pad having a varying radial thickness; and
 said nominally radially thinner portions being circumferentially intermediate adjacent airfoils of the plurality of vanes; and
 wherein an outwardly facing surface of said at least one of said platforms having a first total surface area and said pad having a second surface area, with said second surface area being between 15% and 50% of said first total surface area.

* * * * *